June 12, 1956 W. J. MOORE ET AL 2,750,198
WAGON-SLED
Filed March 11, 1954
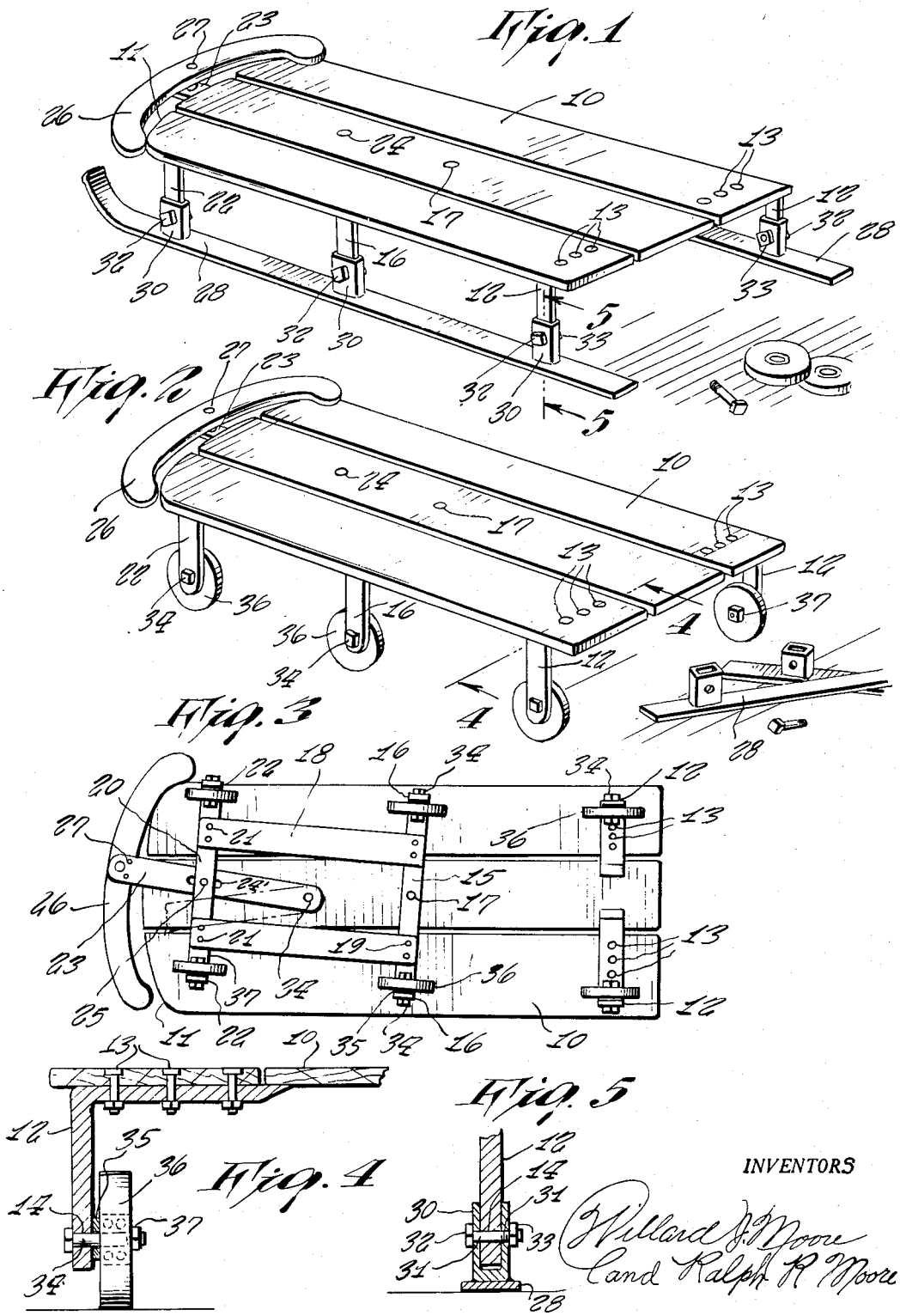
INVENTORS
Willard J. Moore
and Ralph R. Moore

2,750,198
WAGON-SLED

Willard J. Moore and Ralph R. Moore, Clinton, Tenn.

Application March 11, 1954, Serial No. 415,494

5 Claims. (Cl. 280—7.14)

This invention relates to sleds.

It is an object of the present invention to provide a sled that may be used in summer as well as winter.

It is another object of the present invention to provide a sled wherein the runners may be easily and readily removed and replaced by wheels with a minimum of effort.

Other objects of the present invention are to provide a sled bearing the above objects in mind which is of simple construction, has a minimum number of parts, easy to use and efficient in operation.

For other objects and a better understanding of the invention, reference may be had to the following detailed description taken in connection with the accompanying drawing, in which:

Figure 1 is a perspective view of the invention shown ready for use as a sled;

Fig. 2 is a view similar to Fig. 1 but showing the device in use as a wagon;

Fig. 3 is a bottom plan view of the steering mechanism;

Fig. 4 is a vertical sectional view taken along the line 4—4 of Fig. 2; and

Fig. 5 is a vertical sectional view taken along the line 5—5 of Fig. 1.

Referring now more in detail to the drawing, 10 represents the body supporting portion of the sled being of flat rectangular configuration and having a curved forward end 11, substantially as illustrated. A pair of L-shaped rear brackets 12 are secured along their horizontal portions to the rear undersurface of the body 10 by means of the bolts 13, the lower end of the vertical portion thereof being provided with an opening 14.

A U-shaped bracket 15 (Fig. 3) having the depending vertical portions 16 is pivotally secured at its center to the undersurface of the body 10 by means of the bolt 17, the vertical portions 16 near the lower ends being provided with openings similar to the openings 14 in members 12. A pair of parallel, forwardly extending braces 18 are secured at their rear ends to the undersurface of the bracket 15 by means of the bolts 19, the forward ends of the brackets 18 being secured to the undersurface of a U-shaped bracket 20 by means of the bolts 21. The bracket 20 includes vertical depending portions 22 provided near their lower ends with openings similar to the openings 14 of brackets 12. A link 23 is pivotally connected to the body 10 by means of a bolt 24, the link 23 extending forwardly therefrom intermediate the body 10 and bracket 20 and having an elongated slot 24' which receives therethrough a bolt 25 fixedly carried by the bracket 20. A steering arm 26 is secured to the front upper surface of the link 23 by the bolts 27. Thus, by moving the arm 26 laterally, the brackets 15, 20 will pivot as a unit about the bolt 17.

Sled runners 28 have secured on their upper surfaces three hollow members 30 adapted to receive snugly therewithin the vertical portions of the brackets 12, 15 and 20, the members 30 being provided with laterally aligned openings 31 (Fig. 5) aligned with the openings in the lower ends of the brackets. Bolts 32 releasably retain the brackets within the members 30, nuts 33 completing the assembly. Thus, the device may be used as a sled during winter.

When the snow melts and it is desired to use the device as a wagon, it is only necessary to unfasten the bolts 32 and remove the same permitting the removal of the members 30 and the runners 28 from the sled. Bolts 34 of greater length than bolts 32 may then be inserted through the openings in the lower ends of the depending brackets (Fig. 4) to receive thereon the washers 35 and ball bearing wheels 36 secured in place by the nuts 37. Thus, the device may be used as a wagon in summer when the snow has melted. To convert the device back into a sled, it is only necessary to reverse the above operations. Thus, there has been provided a combination sled and wagon and which may be used the entire year around.

The brackets 12, 15 and 20 may be of either square or circular cross section.

It will be noted that the steering assembly may be used in both instances to control either the runners 28 or the bearing wheels 36.

While various changes may be made in the detail construction, it shall be understood that such changes shall be within the spirit and scope of the present invention as defined by the appended claims.

What is claimed as new is:

1. A combination wagon and sled comprising a flat body supporting portion, a pair of rear, laterally aligned depending brackets secured to the undersurface of said body portion, a substantially U-shaped intermediate bracket pivotally mounted at its central portion to the undersurface of said body portion, forwardly extending braces secured at their rear ends to said intermediate bracket, a substantially U-shaped front bracket secured to the front ends of said braces and having depending portions, a link pivotally mounted at its rear end to the undersurface of said body portion intermediate said intermediate and front brackets and extending forwardly of said body portion, a steering arm connected to the front end of said link, and means interconnecting said front bracket and link adapted to permit rotation of said intermediate bracket about its pivotal axis upon actuation of said steering arm, said rear, intermediate and front brackets being adapted to selectively mount a pair of snow runners or a plurality of wheels.

2. A combination wagon and sled according to claim 1, said link extending forwardly intermediate said front bracket and said body portion, said connecting means comprising said front bracket at the center thereof having an upwardly extending pin, said link at the center thereof having an elongated slot receiving said pin therethrough.

3. A combination wagon and sled according to claim 1, said pair of rear depending brackets having laterally aligned openings therethrough near their lower ends, the depending portions of said intermediate bracket having laterally aligned openings near the lower ends thereof, the depending portions of said front bracket having laterally aligned openings near their lower ends, a pair of snow runners, hollow upwardly extending members secured to the upper surface of said snow runners adapted to receive therewithin said depending brackets, said upstanding members having aligned lateral openings, aligned with said depending bracket openings and fastening means passing through said aligned openings whereby to releasably secure said brackets within said upstanding members.

4. A combination wagon and sled according to claim 1, said rear depending brackets having laterally aligned openings therethrough near their lower ends, the depending portions of said intermediate bracket having laterally aligned openings near the lower ends thereof, the depending portions of said front bracket having laterally aligned openings near their lower ends, elongated bolts adapted to pass through said aligned openings in said depending brackets, and a plurality of wheels rotatably mounted on said elongated bolts.

5. A combination wagon and sled according to claim 4, said wheels having roller bearings.

References Cited in the file of this patent

UNITED STATES PATENTS

| | | |
|---|---|---|
| 937,943 | Koopman | Oct. 26, 1909 |
| 1,051,614 | Minish | Jan. 28, 1913 |
| 1,191,281 | Clay | July 18, 1916 |
| 1,409,501 | Volz | Mar. 14, 1922 |
| 1,456,335 | Peterson | May 22, 1923 |
| 1,470,921 | Huber | Oct. 16, 1923 |
| 2,570,674 | Haywood | Oct. 9, 1951 |
| 2,615,722 | Johnson | Oct. 28, 1952 |

FOREIGN PATENTS

| | | |
|---|---|---|
| 29,445 | Sweden | Apr. 23, 1909 |
| 807,255 | France | Oct. 12, 1936 |